(12) United States Patent
Dubey et al.

(10) Patent No.: US 9,665,628 B1
(45) Date of Patent: May 30, 2017

(54) SYSTEMS AND/OR METHODS FOR AUTOMATICALLY CLASSIFYING AND ENRICHING DATA RECORDS IMPORTED FROM BIG DATA AND/OR OTHER SOURCES TO HELP ENSURE DATA INTEGRITY AND CONSISTENCY

(71) Applicant: Xeeva, Inc., Madison Heights, MI (US)

(72) Inventors: Dilip Dubey, Troy, MI (US); Dineshchandra Harikisan Rathi, San Carlos, CA (US); Koushik Kumaraswamy, Littleton, CO (US)

(73) Assignee: XEEVA, INC., Madison Heights, MI (US)

( * ) Notice: Subject to any disclaimer, the term of this patent is extended or adjusted under 35 U.S.C. 154(b) by 0 days.

(21) Appl. No.: 15/172,995

(22) Filed: Jun. 3, 2016

Related U.S. Application Data

(60) Provisional application No. 62/263,701, filed on Dec. 6, 2015.

(51) Int. Cl.
*G06F 7/00* (2006.01)
*G06F 17/30* (2006.01)
*G06F 17/27* (2006.01)

(52) U.S. Cl.
CPC .. *G06F 17/30528* (2013.01); *G06F 17/30377* (2013.01); *G06F 17/30563* (2013.01); *G06F 17/2785* (2013.01)

(58) Field of Classification Search
None
See application file for complete search history.

(56) References Cited

U.S. PATENT DOCUMENTS

| 6,584,451 | B1 | 6/2003 | Shoham et al. |
| 6,606,603 | B1 | 8/2003 | Joseph et al. |
| 6,920,459 | B2 | 7/2005 | Dedhia et al. |
| 7,117,165 | B1 | 10/2006 | Adams et al. |
| 7,146,331 | B1 | 12/2006 | Young |
| 7,165,068 | B2 | 1/2007 | Dedhia et al. |
| 7,225,145 | B2 | 5/2007 | Whitley et al. |

(Continued)

FOREIGN PATENT DOCUMENTS

| CN | 101887523 B | 4/2013 |
| WO | WO 2010/147010 A1 | 12/2010 |

OTHER PUBLICATIONS

Zycus—Source to Pay Software Suite, retrieved Jun. 3, 2016, 6 pages. http://www.zycus.com/.

(Continued)

*Primary Examiner* — Jau-Shya Meng
(74) *Attorney, Agent, or Firm* — Nixon & Vanderhye PC

(57) ABSTRACT

Techniques relating to managing "bad" or "imperfect" data being imported into a database system are described herein. As an example, a lifecycle technology solution helps receive data from a variety of different data sources of a variety of known and/or unknown formats, standardize it, fit it to a known taxonomy through model-assisted classification, store it to a database in a manner that is consistent with the taxonomy, and allow it to be queried for a variety of different usages. Some or all of the disclosed technology concerning auto-classification, enrichment, clustering model and model stacks, and/or the like, may be used in these and/or other regards.

30 Claims, 8 Drawing Sheets

(56) References Cited

U.S. PATENT DOCUMENTS

| | | | | |
|---|---|---|---|---|
| 7,568,148 | B1* | 7/2009 | Bharat | G06F 17/3071 707/999.007 |
| 8,126,701 | B2 | 2/2012 | Beck | |
| 8,515,958 | B2* | 8/2013 | Knight | G06F 17/30713 707/737 |
| 8,612,300 | B2 | 12/2013 | Tung et al. | |
| 8,635,172 | B1* | 1/2014 | Buryak | G06K 9/6262 706/12 |
| 8,732,036 | B2 | 5/2014 | Arya et al. | |
| 8,904,471 | B1 | 12/2014 | Eisner et al. | |
| 9,053,457 | B2 | 6/2015 | Dedhia | |
| 2003/0018629 | A1* | 1/2003 | Namba | G06F 17/3071 |
| 2008/0250060 | A1 | 10/2008 | Grois | |
| 2010/0293451 | A1 | 11/2010 | Carus | |
| 2012/0066217 | A1 | 3/2012 | Eder | |
| 2012/0109651 | A1 | 5/2012 | Chen | |
| 2013/0096892 | A1 | 4/2013 | Essa et al. | |
| 2013/0338496 | A1 | 12/2013 | Hielscher | |
| 2014/0172914 | A1 | 6/2014 | Elnikety et al. | |

OTHER PUBLICATIONS

Zycus—The Business Need for Procure to Pay, retrieved Jun. 3, 2016, 8 pages. http://www.zycus.com/solution/zycus-procure-to-pay-solution-overview.html.

Zycus—The Business Need for e-Procurement Solution, retrieved Jun. 3, 2016, 8 pages. http://www.zycus.com/solution/procure-to-pay/e-procurement.html.

Zycus—Catalog Management, retrieved Jun. 3, 2016, 7 pages. http://www.zycus.com/solution/procure-to-pay/e-procurement/catalog-management-software.html.

Zycus—Requisition Processing, retrieved Jun. 3, 2016, 7 pages. http://www.zycus.com/solution/procure-to-pay/e-procurement/requisition-management-software.html.

Zycus—Purchase Order Management, retrieved Jun. 3, 2016, 7 pages. http://www.zycus.com/solution/procure-to-pay/e-procurement/purchase-order-management-software.html.

Zycus—The Business Need for e-Invoicing Solution, retrieved Jun. 3, 2016, 8 pages. http://www.zycus.com/solution/procure-to-pay/e-invoicing.html.

Zycus—Electronic Invoice Capture, retrieved Jun. 3, 2016, 9 pages. http://www.zycus.com/solution/procure-to-pay/e-invoicing/electronic-invoice-capture-software.html.

Zycus—Matching and Workflow, retrieved Jun. 3, 2016, 7 pages. http://www.zycus.com/solution/procure-to-pay/e-invoicing/matching-workflow-software.html.

Zycus—Payments and Discounting, retrieved Jun. 3, 2016, 7 pages. http://www.zycus.com/solution/procure-to-pay/e-invoicing/payments-discounting-software.html.

Zycus—The Business Need for Spend Analysis Solution, retrieved Jun. 3, 2016, 9 pages. http://www.zycus.com/solution/spend-analysis.html.

Zycus—The Business Need for Strategic Sourcing Solution, retrieved Jun. 3, 2016, 8 pages. http://www.zycus.com/solution/strategic-sourcing.html.

Zycus—The Business Need for Project Management Solution, retrieved Jun. 3, 2016, 7 pages. http://www.zycus.com/solution/project-management.html.

Zycus—The Business Need for Contract Management Solution, retrieved Jun. 3, 2016, 9 pages. http://www.zycus.com/solution/contract-management.html.

Zycus—The Business Need for Supplier Management Solution, retrieved Jun. 3, 2016, 9 pages. http://www.zycus.com/solution/supplier-management.html.

Zycus—The Business Need for Management Procurement Savings, retrieved Jun. 3, 2016, 8 pages. http://www.zycus.com/solution/procurement-finance-collaboration.html.

Zycus—The Business Need for Request Management Solution, retrieved Jun. 3, 2016, 6 pages. http://www.zycus.com/solution/request-management.html.

Zycus—Why Zycus Supplier Network, retrieved Jun. 3, 2016, 6 pages. http://www.zycus.com/solution/supplier-network.html.

Ariba—Control the Spending, Collaborate with Suppliers, and Contribute to the Bottom Line, retrieved Jun. 3, 2016, 4 pages. http://www.ariba.com/solutions/buy.

Ariba—Real Spend Management Begins with Clear Spend Visibility, retrieved Jun. 3, 2016, 5 pages. http://www.ariba.com/solutions/buy/spend-analysis.

Ariba—Build the Right Strategic Sourcing Environment to Cut Your Costs and Minimize Your Risks, retrieved Jun. 3, 2016, 5 pages. http://www.ariba.com/solutions/buy/sourcing.

Ariba—It's Time to Get Strategic About Tactical Sourcing, retrieved Jun. 3, 2016, 5 pages. http://www.ariba.com/solutions/buy/ariba-spot-quote.

Ariba—Discover New Business Relationships. Today., retrieved Jun. 3, 2016, 4 pages. http://www.ariba.com/solutions/buy/discovery-for-buyers.

Ariba—No One Makes Contract Collaboration and Compliance Easier Than Ariba, retrieved Jun. 3, 2016, 4 pages. http://www.ariba.com/solutions/buy/contract-management.

Ariba—Achieve Compliance and Control while Cutting Costs and Risks, retrieved Jun. 3, 2016, 4 pages. http://www.ariba.com/solutions/buy/procurement-solutions.

Ariba—Introducing Ariba Collaborative Supply Chain, retrieved Jun. 3, 2016, 5 pages. http://www.ariba.com/solutions/buy/supply-chain-collaboration.

Ariba—Better Supplier Performance Starts with High-Quality Supplier Information, retrieved Jun. 3, 2016, 4 pages. http://www.ariba.com/solutions/buy/supplier-management.

Coupa Advantage—Why Coupa, retrieved Jun. 3, 2016, 16 pages. http://www.coupa.com/why-coupa/coupa-advantage/.

Coupa—Coupa Procurement System, retrieved Jun. 3, 2016, 18 pages. http://www.coupa.com/software/procurement/.

Coupa—Coupa Invoicing Software, retrieved Jun. 3, 2016, 14 pages. http://www.coupa.com/software/invoicing/.

Coupa—Coupa Expenses, retrieved Jun. 3, 2016, 19 pages. http://www.coupa.com/software/expense-management/.

Coupa—Coupa Sourcing Software Solution, retrieved Jun. 3, 2016, 19 pages. http://www.coupa.com/software/sourcing/.

Coupa—Coupa Inventory, retrieved Jun. 3, 2016, 18 pages. http://www.coupa.com/software/inventory/.

Coupa—Coupa Contract Lifecycle Management Tools (COUPA CLM), retrieved Jun. 3, 2016, 19 pages. http://www.coupa.com/software/contract-lifecycle-management/.

Coupa—Coupa Budgets, retrieved Jun. 3, 2016, 18 pages. http://www.coupa.com/software/budgets/.

Coupa—Coupa Analytics, retrieved Jun. 3, 2016, 18 pages. http://www.coupa.com/software/analytics/.

Coupa—Open Business Network, retrieved Jun. 3, 2016, 19 pages. http://www.coupa.com/software/open-business-network/.

Coupa—Supplier Information Management, retrieved Jun. 3, 2016, 14 pages. http://www.coupa.com/software/supplier-information-management/.

Coupa—Coupa Storefront, retrieved Jun. 3, 2016, 18 pages. http://www.coupa.com/software/storefront/.

U.S. Appl. No. 15/173,106, filed Jun. 3, 2016, Dubey et al., "Model Stacks for Automatically Classifying Data Records Imported From Big Data and/or Other Sources, Associated Systems, and/or Methods".

International Search Report mailing date Apr. 5, 2017 and Written Opinion.

Invitation to Pay Additional Fees and Where Applicable, Protest Fees issued on Feb. 2, 2017 in related Application No. PCT/US16/64395, 2 pages.

* cited by examiner

SYSTEMS AND/OR METHODS FOR AUTOMATICALLY CLASSIFYING AND ENRICHING DATA RECORDS IMPORTED FROM BIG DATA AND/OR OTHER SOURCES TO HELP ENSURE DATA INTEGRITY AND CONSISTENCY

CROSS-REFERENCE TO RELATED APPLICATION

This application claims the benefit of U.S. Application Ser. No. 62/263,701 filed on Dec. 6, 2015, the entire contents of which are hereby incorporated herein by reference.

TECHNICAL FIELD

Certain example embodiments described herein relate to systems and/or methods for improving the integrity and consistency of data imported from Big Data and/or other data sources. More particularly, certain example embodiments described herein relate to techniques for managing "bad" or "imperfect" data being imported into a database system by automatically classifying and enriching data records, e.g., using self-learning models that help fit such data to given taxonomies and/or the like, in order to provide meaningful outputs.

BACKGROUND AND SUMMARY

A database may be thought of, at least in theory, as an organized collection of data, very often defined in connection with schemas, tables, queries, reports, views, and/or other objects, and very often organized in a logical, object-oriented, relational, and/or other manner Databases have become fundamental components for many modern computer systems and, in this regard, database management systems (DBMSs) typical include computer software applications that interact with one or more users, other applications, and the database itself, e.g., to facilitate the definition, creation, querying, updating, administration, etc., of the databases and/or the data associated therewith.

Databases, directly or indirectly, support a wide variety of applications. For instance, databases underlie computerized library catalog systems, flight reservation systems, computerized parts inventory systems, etc. Some databases support lead tracking and sales-related metrics. Other databases support organizations' human resources functions including, for example, maintaining employees' personal information, vacation time, performance, and/or the like. Other databases support accounting functions, are involved in economic data analysis, and/or the like. So-called business-to-business (B2B), business-to-consumer (B2C), and other patterns of purchasing also are typically enabled by databases.

The advent of so-called Big Data has placed a number of challenges on modern computerized database technologies. Although there are a number of different definitions of Big Data, those skilled in the art understand that it generally refers to datasets so large and/or complex that traditional data processing applications are inadequate. Challenges also arise because Big Data oftentimes is not structured, which makes it difficult and sometimes even impossible to process using conventional database systems. Challenges arise in areas including data analysis, capturing, curation, searching, sharing, storage, transferring, visualization, privacy, and/or the like. Indeed, with so many different information sources, so many non-standard input source types, the ability to store so much information, and the desire to critically analyze it, challenges associated with how best to manage such data are growing.

Certain example embodiments address the above and/or other concerns. For instance, certain example embodiments help manage "bad" or "imperfect" data. For instance, the industry standard for databases used in procurement involves only 16% clean and current data. Although organizations oftentimes are concerned about their "bottom lines," procurement in healthcare-related contexts can have unfortunate complications. Certain example embodiments provide a lifecycle technology solution that helps receive data from a variety of different data sources of a variety of known and/or unknown formats, standardize it, fit it to a known taxonomy through model-assisted classification, store it to a database in a manner that is consistent with the taxonomy, and allow it to be queried for a variety of different usages. Thus, although it typically is technologically infeasible to create "perfect data" (especially, for example, in Big Data contexts), certain example embodiments help manage imperfect and/or bad data, e.g., promoting data integrity and/or consistency, in a manner that self-learns and/or evolves over time.

One aspect of certain example embodiments thus relates to transforming unstructured textual and/or other data to enriched, cleansed, and well-formed data. Another aspect of certain example embodiments relates to classification to a taxonomy, which can in at least some instances advantageously provide an indication regarding what a given record or data-point in question is. This may in turn allow inferences about the associated entry to be made, e.g., such that the attributes that are important or use to know can be identified. Furthermore, enrichment of the type described herein can be used to "fill in the blanks" in terms of the missing attribute information.

In certain example embodiments, a data classification system is provided. An input interface is configured to receive documents comprising data entries, with at least some of the data entries having associated features represented directly in the documents. A data warehouse is backed by a non-transitory computer readable storage medium and configured to store curated and classified data elements. A model repository stores a plurality of different classification model stacks, with each classification model stack including at least one classification model. Processing resources, including at least one processor and a memory, are configured to at least: inspect documents received via the input interface to identify, as input data, data entries and their associated features, if any, located in the inspected documents; and segment the input data into different processing groups. For each different processing group: one or more model stacks from the model repository to be executed on the respective processing group is/are identified; each identified model stack is executed on the respective processing group; results from the execution of each identified model stack are ensembled to arrive at a classification result for each data entry in the respective processing group; the classification results are grouped into one of first and second classification types, with the first classification type corresponding to a confirmed classification and the second classification type corresponding to an unconfirmed classification; for the first classification type, each data entry in this group is moved to a result set; for the second classification type, a determination is made as to the processing group from among those processing groups not yet processed that is most closely related to each data entry in this group, and each data entry in this group is moved to its determined most closely related processing group; each data entry in the result set is stored, with or without additional processing, to the data warehouse, in accordance with its arrived at classification result; and records in the data warehouse are able to be queried from a computer terminal.

In certain example embodiments, a data classification system is provided. An input interface is configured to receive documents comprising line-item data entries, with at least some of the line-item data entries having associated attributes represented directly in the documents. A data warehouse is backed by a non-transitory computer readable storage medium and configured to store curated and classified data elements. A classification model stack includes (a) a plurality of classification models, (b) a plurality of confidence models, and (c) a related multi-level taxonomy of classifications applicable to line-item data entries included in documents received via the input interface. Processing resources, including at least one processor and a memory, configured to at least: execute classification models from the classification model stack to associate the line-item data entries included in the documents received via the input interface with potential classifications at each level in the related taxonomy; execute confidence models from the classification model stack to assign probabilities of correctness for each potential classification generated by execution of the classification models; determine, for each of the line-item data entries included in the documents received via the input interface, a most granular level of potential classification that meets or exceeds a threshold value; designate a classification result corresponding to the determined most granular level of potential classification for each of the line-item data entries included in the documents received via the input interface; store each line-item data entry, with or without additional processing, to the data warehouse, along with an indication of its associated classification result; and enable records in the data warehouse to be queried from a computer terminal.

Corresponding methods, computer readable storage mediums tangibly storing instructions for executing such methods, and/or the like also are contemplated.

The features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments provide a multi-component technology platform that works on sparse, ill-formed, unstructured data to turn it into actionable data and insights within a short period of time. In this regard, certain example embodiments include a set of complex subsystems working with alone and/or with each other. As described in greater detail below, various ones of the subsystems are powered by machine learning, mathematical, and domain context models. Certain subsystems may be self-learning in nature, e.g., so that the ability to manage imperfect or bad data is improved over time.

Technical aspects underlying the technology disclosed herein will become more apparent when described in connection with the example scenario that follows, which involves spend data used for procurement purposes. As will become more apparent from the description below, this example scenario includes, among other things, ingesting and processing information from a variety of different catalogs from which items can be ordered, purchase order information, accounts payable information, etc. Of course, it will be appreciated that although spend data and procurement is one example scenario where data tends to be particularly bad or imperfect, the technology described herein has broad application to a variety of different input and output types for a variety of different purposes in this example scenario and/or others.

Figure 1:
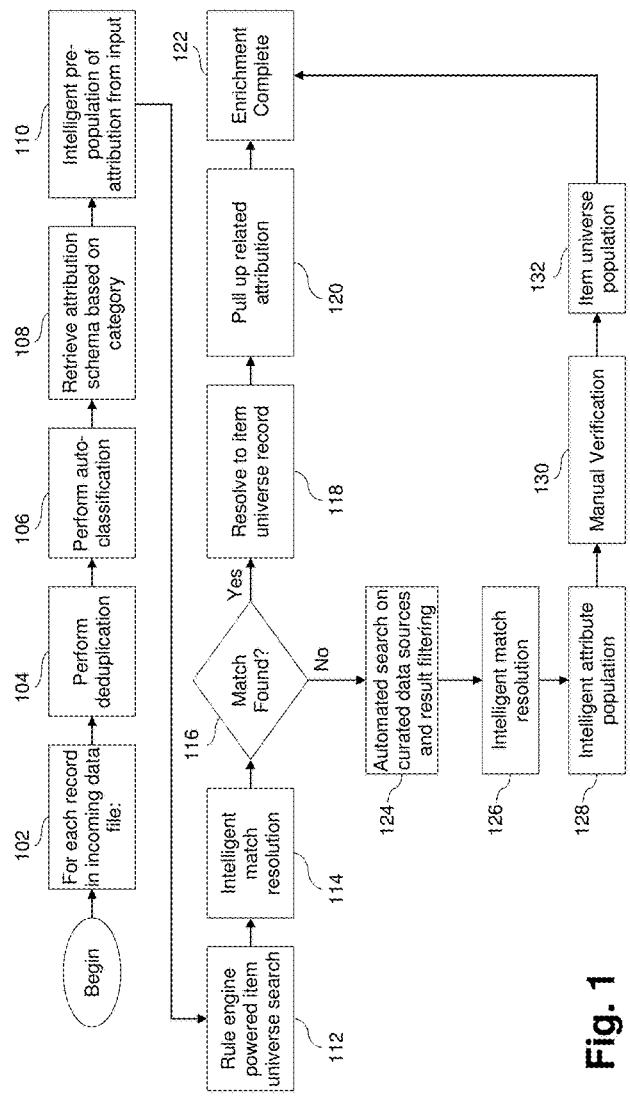
FIG. 1 is a flowchart showing how incoming data may be processed to make it more manageable, in accordance with certain example embodiments.

FIG. 1 is a flowchart showing how incoming data may be processed to make it more manageable, in accordance with certain example embodiments. The example process represented by FIG. 1 works on each record in an incoming data file (step 102). In the example scenario outlined above, income data files may include, for example, accounts payable, purchase order, and item master files. The incoming data files may be provided by a client using the system for procurement purposes and/or an external party (e.g., a clearinghouse that processes accounts payable, purchase order, and/or other information; a supplier who provides a catalog; etc.). Deduplication and/or record linkage is performed (step 104). This helps to merge the incoming data into single dataset. A similarity search algorithm or the like may be executed on the merged data to group similar records together, and a rule-based resolution of duplicates may be performed (e.g., so that the same records across datasets are tagged as such). Deduplication and/or record linkage of this sort may help resolve situations where there are seemingly different names for the same items (e.g., "IBM" vs. "International Business Machines Corp." vs. "Int'l Business Machines" vs. "Intl. Business Machines" etc.).

Figure 2:
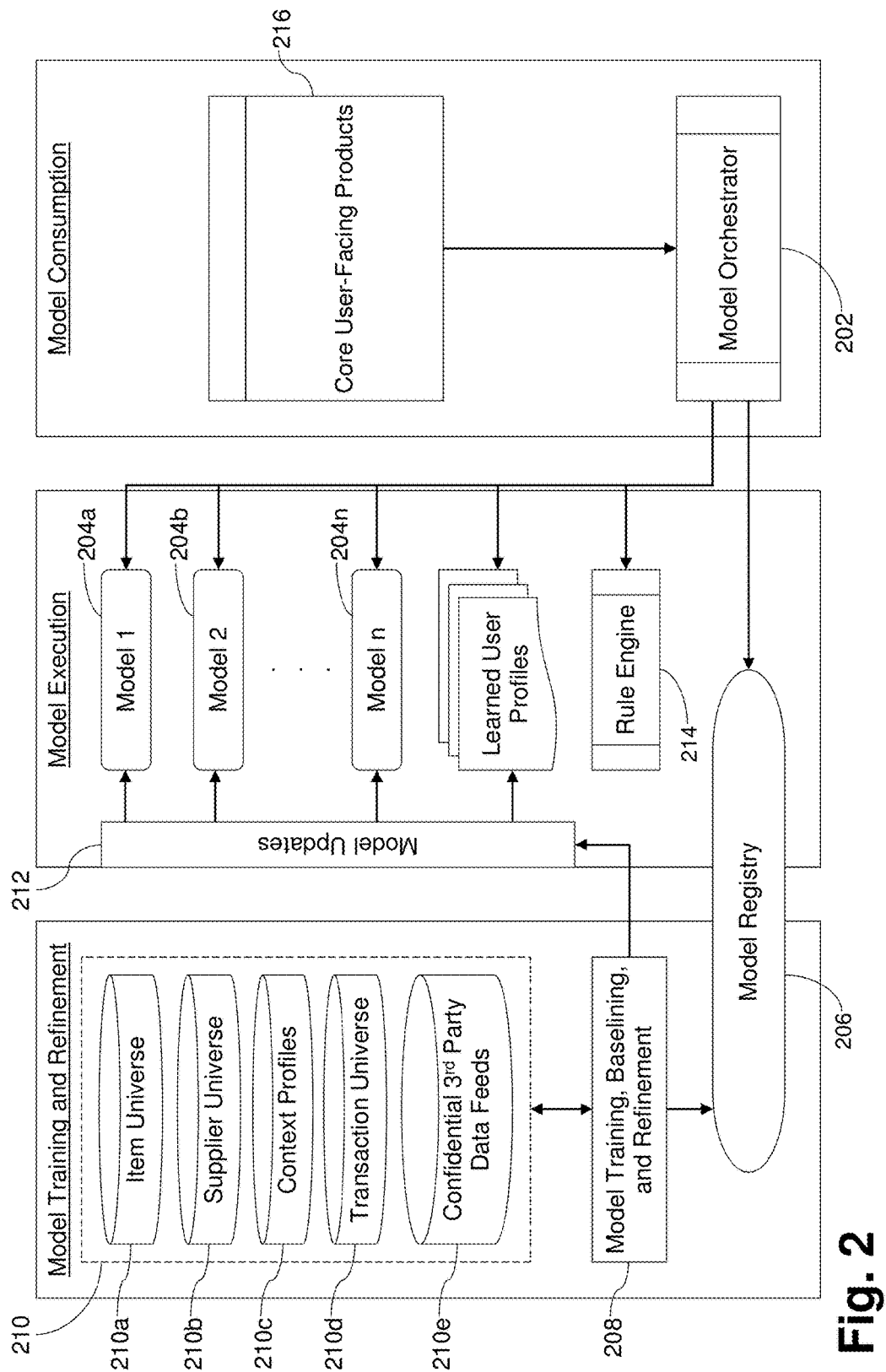
FIG. 2 is a block diagram of an illustrative auto-classification system, with enrichment-related functionality, that may be used in connection with certain example embodiments.

The incoming dataset is run through an auto-classification system, and a classification for each record is obtained (step 106). FIG. 2 is a block diagram of an illustrative auto-classification system, with enrichment-related functionality, that may be used in connection with certain example embodiments. FIG. 2 may be thought of as a logical architecture that helps realize at least some of the platform functionality depicted in FIG. 1. Among other things, the auto-classification system provides granular data classification to clients. At a high level, in certain example embodiments, the system works by taking in data available in client enterprise resource planning (ERP) systems (e.g., Purchase Order (PO), Accounts Payable (AP), Vendor Master, Item Master, and/or other information), and then applying a combination of machine learning, mathematical, and domain driven heuristic context models to them to provide classification outputs, e.g., at a line or individual record level. As will be appreciated from the description above, the auto-classification system is self-learning in nature, e.g., so that it gets better in terms of producing accurate classifications with progressive use, potentially within familiar industry verticals and/or within completely new ones.

Figure 3:
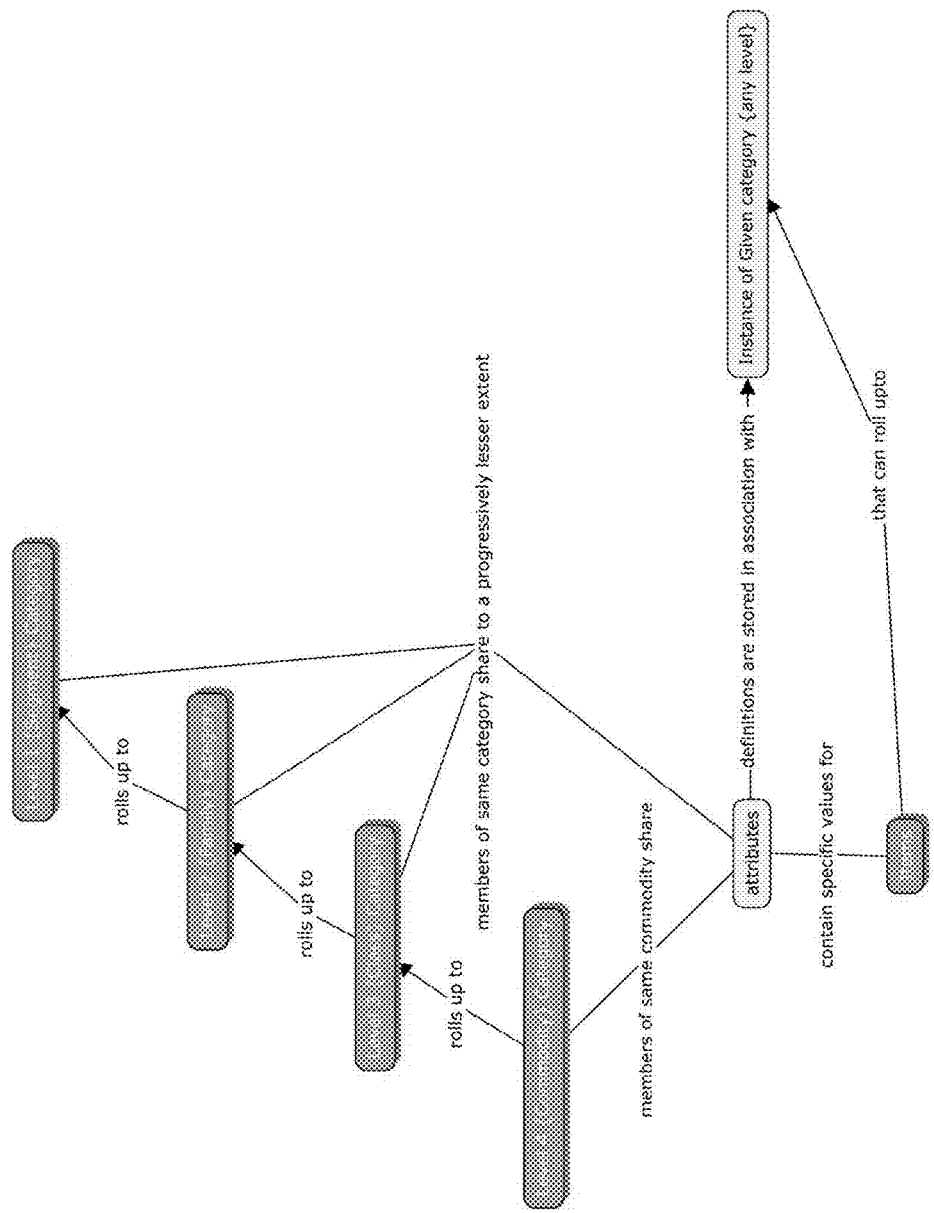
FIG. 3 is a schematic view of an attribution taxonomy example, which may be used in connection with certain example embodiments.

The auto-classification system may use any suitable classification taxonomies such as, for example, the United Nations Standards Products and Services code (UNSPSC). The system supports classification of the incoming spend data at varying levels of granularity (e.g., by naming at the Segment, Family, Class, and Commodity levels). In this regard, FIG. 3 is a schematic view of an attribution taxonomy example, which may be used in connection with certain example embodiments, and the following table is an extract of a sample attribution schema consistent with FIG. 3 and which may be used in connection with certain example embodiments.

| UNSPSC Category | Description | Relevant Attribute |
|---|---|---|
| 12163500 | Oil well sealants | Adheres To |
| 12163500 | Oil well sealants | Application |
| 12163500 | Oil well sealants | Application Temp. Range |
| 12163500 | Oil well sealants | Application Time |
| 12163500 | Oil well sealants | Characteristics |
| 12163500 | Oil well sealants | Color |
| 12163500 | Oil well sealants | Container Type |
| 12163500 | Oil well sealants | Coverage |
| 12163500 | Oil well sealants | Dry Time |
| 12163500 | Oil well sealants | Dry Time Recoat |
| 12163500 | Oil well sealants | Dry Time Tack Free |
| 12163500 | Oil well sealants | Flash Point |
| 12163500 | Oil well sealants | For Use With |
| 12163500 | Oil well sealants | Functional Cure |
| 12163500 | Oil well sealants | Item |
| 12163500 | Oil well sealants | Number of Components |
| 12163500 | Oil well sealants | Performance Temp. Range |
| 12163500 | Oil well sealants | Practical Square Feet |
| 12163500 | Oil well sealants | Size |
| 12163500 | Oil well sealants | Temp. Range |
| 12163500 | Oil well sealants | Traffic Hours |
| 12163500 | Oil well sealants | VOC |
| 12163500 | Oil well sealants | Yield Strength |

In some instances, from a classification standpoint, just knowing the category oftentimes will be "good enough" to achieve good results. The attribution table referenced above may be used to set up subsequent enrichment processes and thus can be potentially more useful in that respect, at least in these instances. Although a table is mentioned, it will be appreciated that any other suitable object model that encapsulates requisite or desired attribution information can be used in certain example embodiments.

Other taxonomies that may be used include eCl@ss and proprietary taxonomies (e.g., taxonomies initially built "by hand" by domain experts and/or others and potentially subsequently refined over time as a result of machine learning). The auto-classification system may assist in, and/or automatically perform, the self-learning of mappings between a given taxonomy and one or more others.

The auto-classification system (when being applied to client datasets) may be invoked in a mode optimized for or otherwise favoring speed (e.g., at the expense of coverage), or optimized for or otherwise favoring comprehensiveness (e.g., at the expense of time). That is, with respect to the former, in certain example embodiments, the auto-classification system (and/or components of it, such as execution of the model stacks) may be optimized for or otherwise favor time, where the system (and/or its components) run quickly but may not address all of the line items within the dataset under consideration. With respect to the latter, in certain example embodiments, the auto-classification system (and/or components of it, such as execution of the model stacks) may be optimized for or otherwise favor comprehensiveness, such that the system (and/or its components) is configured to methodically process the records available within the dataset and build out features on-the-fly, and to use these features for the classification process. In this case, the model may operate in a batch mode. It will be appreciated that the mode selected may have implications on the computational complexity of the solution and/or the time needed. In certain example embodiments, different model stacks corresponding to certain processing buckets (that result of segmentation, for example) may have different complexities.

In any event, the auto-classification system may be used in near real-time spend analytics that serves to give procurement teams (e.g., buyers, category managers, strategic sourcing professionals, and/or others) a bird's eye view of spending through their enterprises. Procurement professionals may be able to identify high spend areas, as well supplier fragmentation/penetration within hours or even minutes of providing the data (e.g., instead of weeks and months that conventional solutions take). This may be facilitated in some instances by invoking the system in time-optimized mode. Furthermore, because spend is usually concentrated within a few vendors, the tool can focus on only the records that contribute to top 80-90% of spend, and do so quickly, at least in some example instances. In such cases, the remainder tends to be not business critical and therefore can be covered in the "batch or coverage optimized mode."

As can be seen in FIG. 2, the auto-classification system includes a variety of computing components that work together. The structure and function of the elements shown in FIG. 2 will be discussed in greater detail below. However, in brief, a model orchestrator 202 segments the incoming dataset into processing buckets based on input data quality of various records, invokes the models from model registry in order (e.g., highest to lowest data quality) and performs adaptive ensembling on the results of the model runs to get to the final outcome. A model repository includes a mapping between given model stack configuration, applicable level of information uncertainty and data quality, performance baselines in this context, as well as run-time estimates for the same. The model stacks 204a-204n are the actual classification and enrichment models that work on the input data (which, in this example scenario, is spend data). The model repository thus includes a model registry 206 that stores information about the model stacks 204a-204n, as well as a store 208 for data and/or metadata about the model training, baselining, and model refinement. A reference data universe 210 is used for model training and refinement. This includes, for example, an item data store 210a, a supplier store 210b, a context store 210c, a transaction (or spend) store 210d, and a store or interface for receiving a feed of third-party data 210e.

The auto-classification system includes processing resources such as, for example, at least one processor and a memory operably coupled thereto. The processing resources are configured to execute functionality comprising the following execution logic:

- Invoke auto-class in given mode (e.g., optimizing or otherwise favoring speed or comprehensiveness, as noted above).
- Inspect incoming data and determine what features exist therein (e.g., item descriptions, quantity bought, unit price, location of purchase, supplier, etc.).
- Identify and tag related records across incoming files (e.g., PO, AP, item master, and/or other files), as appropriate and available.
- Retrieve all matching context profiles from the reference universe 210. Context profiles, which may be stored in the context store 210c, are discussed in greater detail below.
- Segment input data into n processing buckets {B1 ... Bn} based on systemic information uncertainty. Segmenting and information uncertainty are further discussed below.
- For each bucket $B_i$, i in [1,n]:
    - Determine which model stacks need to be executed based on input mode.
    - Execute each model stack identified in the previous operation.
    - Perform adaptive ensembling/Ensemble the results to arrive at classification for records. Example ensembling details are provided below.
        - This operation takes into account the results of runs from various model stacks (as mentioned above), along with unprocessed records from other buckets from previous runs.
        - Group the results into "confirmed classification" or "other." The description concerning adaptive ensembling below provides further information on how this may be accomplished, in certain example embodiments.
        - With the confirmed classification group:
            - Retrieve each record in the group.
            - Retrieve related records across datasets.
            - Assign the inferred classification to the related records.
            - Move the confirmed classification (original and assigned) from the processing mix into the final result set.
        - With an "other" group classification:
            - Retrieve each record while retaining the confidence scores from the current process.
            - Based on available features, etc., determine a nearest processing bucket $[B_{i+1}, B_n]$ with the highest possible weight, and move the record into that identified bucket.
    - Repeat this procedure, iteratively, for each processing bucket $B_i$ until all n buckets are processed.
- Collate the results, and return control to the invoker.

Context profiles (also sometimes referred to as context models) may be used to reduce the dimensionality of the problems that machine learning and other models solve and thus may be used as a pre-processing step. Context profiles are detailed here but may be invoked prior to segmentation in the logic, in certain example embodiments. As an example, from the input data in the "indirect spend" arena, one of the locations might be known to be a "forming" operation within manufacturing. The system in certain example embodiments may have a context profile that outlines the indirect spend categories associated with such an operation. In such a case, having this context profile helps to reduce the auto-classification solution possibility such that it likely lies within what the profiles will retrieve. In certain example embodiments, model stack outputs can be combined with this context profile, e.g., to be more sure of the output classification. Additionally, or in the alternative, context profiles may be used as a source of features themselves for machine learning models to operate on when input data quality is very poor or feature-deprived. In this regard, context profiles may be constructs created and/or collected by harnessing deep domain expertise in the relevant area (which, in this example scenario, is the indirect spend arena). For instance, they may be built on spend data that has been handled over years, and they may be specific to industry verticals, sub-verticals, and/or the like.

Information Uncertainty ($\delta I$) may be thought of as a property underlying the auto-classification system. That is, it may be thought of as being an indicator of how clearly the system "sees" the data in varying environments and contexts. Areas where the system can see clearly are labeled zones of low information uncertainty; foggy areas for the system are labeled zones of high $\delta I$. In general, the higher the $\delta I$, the more complex the model stacks need to be when solving the classification problem.

Figure 4:
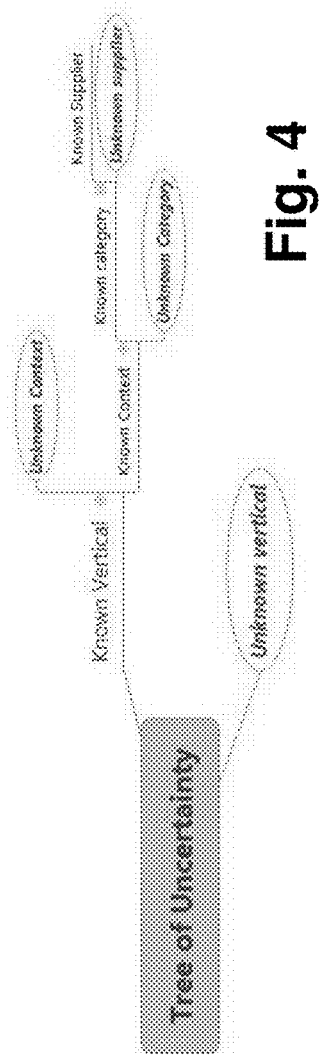
FIG. 4 is an example of information uncertainty in the spend analytics context.

One driver of information uncertainty within the auto-classification system relates to how well the reference universes are populated. In this example scenario, information uncertainty will be driven by how well the context, supplier, item, and/or other reference universes are populated, for a given spend type. The richer this data, the lower the $\delta I$ under which the system operates. FIG. 4 is an example of this type of information uncertainty.

Another $\delta I$ driver is the "resolution" of the model stacks for a given data quality. As an example in the indirect spend arena, the system may have a well instrumented spend scope but still operate with large variations in performance when input data quality is poor, e.g., if the available model-stacks are not fine-grained enough to solve for this case.

One way to bound or reduce $\delta I$ in the system involves ensuring that rich data exists in reference universes for various spend scopes, and that model stacks become more fine-grained across the data quality spectrum.

One way to illustrate this concept of $\delta I$ is to do so at a category level. The following table provides a qualitative illustration of what that might look like.

| Context Profiles | Supplier in Universe | Item in Universe | Category level Information Uncertainty |
| --- | --- | --- | --- |
| None | None | None | Extreme |
| Exist | None | None | High |
| Exist | Exist | None | Medium |
| Exist | Exist | Exist | Low |

It can be seen that the auto-classification system's information uncertainty is in some respects inversely correlated to the concept of input data quality (at least for a given level of reference data in the universe), computationally speaking.

That is, in general, the higher the data quality of a given processing bucket, the lower the complexity of the problem that the auto-classification system has to solve. As a result, and generally speaking, simple model stacks can help with (in this case) classification.

It will be appreciated that the auto-classification system's $\delta I$ may be known a priori, because the state of universe population for various spend scopes, and the performance baselines of model stacks on various input data qualities from the model registry, may be known. The self-learning aspect of the auto-classification system design may help to progressively minimize $\delta I$ over the problem space, e.g., with each execution of the system, as described in greater detail below.

The same set of models can be stacked in different ways (e.g., with variations in pre-processing, etc.) to operate in different zones of $\delta I$. Adaptive ensembling helps to combat $\delta I$ within the auto-classification system.

The auto-classification system may include a number of different models (e.g., machine learning, mathematical, and context models), with each being suited to operate on a given input data quality. Prior to invocation, the zone of optimal performance for a given model stack for given data quality may be known. Moreover, the variation of performance for different levels of reference data strengths also may be known a priori. Thus, the model stacks may be instrumented to work with varying levels of data quality and within different zones of $\delta I$. As noted above, the results of model selection, training, and baselining, may be stored within the model registry in the store 208.

Input dataset segmentation may help to intelligently pre-process and partition the input dataset (which oftentimes will be received from a client) as a preparatory step prior to executing the right model stacks in the right sequence. A variety of factors may be considered by the segmentation process. For example, segmentation might consider some or all of the following and/or other factors:

Context profiles (e.g., relevant to the reference universe). Here, segmentation may retrieve all available context profiles for the vertical. They may be matched with the input dataset and resolved into context groups. This may be done because there may be granular contexts associated with one part of the data as opposed to another. As an example only, context data may be provided for a "forming" operation in manufacturing, but not for a "casting" operation.

Known vs. unknown supplier segmentation (e.g., relevant to the reference universe). This may involve a machine-learning process that matches up incoming supplier information with the supplier universe, and then segmenting the incoming vendors into known vs. unknown groups (e.g., from the supplier universe point of view).

Language based segmentation (e.g., relevant to model performance). Clients may be global in nature and thus may have several ERP systems being utilized (and potentially fragmented along regional or other lines), with data itself being stored in local languages, currency in different denominations, etc. Segmenting data into homogenous buckets (e.g., from a language consistency standpoint) may be within the purview of the segmentation process in certain example embodiments.

Raw input feature availability and quality (e.g., relevant to the reference universe). The constituent models in the auto-classification system may operate on processed representations of the input data that comes from a client ERP system. By nature of the problem definition, in some instances, not all of the data will have the same raw information in the same consistent format. Some parts of data may be richer and better attributed as compared to others. For example, descriptions may vary based on AP lines, PO lines, etc. The segmentation process may operate to break up data into buckets with consistent (or at least more consistent) data quality. Here, quality may be thought of as referring to the presence or absence of a field (for example), and/or the contents of a field.

In certain example embodiments, the process of segmentation may work as follows. The process takes all of the dimensions of consideration (such as, for example, those mentioned above) and apply them to the input dataset to arrive at n processing buckets. In this case, the data quality within a processing bucket likely will be consistent, but quality likely will differ from bucket-to-bucket. A typical bucket will have different values for different dimensions of consideration. Next, each dimension (and value that it can take) will have an associated weight that is stored in the model registry. These weights may in certain example embodiments reflect how well the auto-classification system is primed to solve them. Weights may be determined in any suitable manner. For example, the closer we can get to the "sweet spot" of the auto-classification system, the higher the total weight will be. As an example, the English language would receive a higher weight than Chinese (depending on the progress made in training). With context profiles, the level of granularity at which they can be applied may help drive the weights. Taking the example of a spend context profile, this might mean low weight at the vertical level, better weight at the sub-vertical level, and best weight for location/operation type. Thus, it can be seen that if there is a bucket of records that has locational/operation type profile and English language and known supplier, etc., the system can "see" very well. There accordingly is low information uncertainty and higher weight. This bucket gets prioritized for processing, e.g., at the front of the queue. The process now takes each bucket and computes its overall weighting based on constituent dimensions and their values. As a result, each of the n processing buckets will have a composite weight value attached to it. In certain example embodiments, weights may be constructed so that higher weight values indicate zones of lower $\delta I$ for the system. Finally, the buckets may be sorted in descending order of weights so that bucket $B_1$ reflects lowest $\delta I$, and $B_n$ is the highest $\delta I$. The segmented buckets then may be processed, e.g., as mentioned above in describing the example execution logic.

A model stack is a unit of execution for the auto-classification system and may be thought of as a set of one or more models working together. In certain example embodiments, the models in a model stack may be a combination, sub-combination, or combination of sub-combinations of machine learning, mathematical, and context models. For instance, a model stack may include two machine learning models; or one context and one machine learning model; or etc. A model stack typically will have specific data quality context(s) associated with it and be listed as such within the model registry. Models stacks can have different characteristics when used within different zones of information uncertainty. Similarly, they may have different associated performance baselines inside model registry. As above, model stacks may be invokable on one of the example macro-mode optimizations discussed above. Details concerning one example model stack are provided below.

The model registry may include information indicating which model stack is appropriate to run with what mode in a given context. The execution baseline information stored in the model registry may allow reasonable estimates of the execution time for a given model stack to be made for an input dataset, e.g., where volumetrics are known.

Parameterized model execution may be supported, wherein when optimizing for speed, it is not necessary in certain example embodiments to exclude whole model stacks (especially when feature build-out happens); rather, the extent or subset of records for which an involved model stack needs to be executed can be specified in some instances. The adaptive ensembling logic may combine records from different model stacks appropriate to get to a final result, at least in certain example embodiments.

Ensembling may be thought of as the process of combining more than one machine learning or other model to solve a given learning problem. In the context of auto-classification, a more sophisticated version of this process, referred to herein as adaptive ensembling, may be used. Adaptive ensembling may be thought of as combining the results of different model stacks (machine learning or otherwise) to obtain a final classification output. As mentioned earlier, adaptive ensembling may help play a role in getting to the final classification output by adequately compensating for δI.

This adaptive ensembling is "adaptive" not only because it is able to work across different classes of models, but also because ensembling behavior in this instance may be a function of (a) information uncertainty under which a model stack is operating under, and (b) the confidence (probability of correctness) of a given model stack's output.

A confidence score may be associated with a classification output from a model stack, e.g., as a model artifact. In certain example embodiments, this value may not be an absolute value (e.g., not an absolute indication of how well the model performs) but rather may be a value to be interpreted in the context in which the model is run. Controlled (e.g., supervised learning) experiments may be used to train the model in the first place and thus may help define the best way to use the confidence probabilities that the model stacks outputs. The probabilities may be normalized in some way and may be specified for a subset of the problem space in which the model specializes. For example, each run of the VSM is capable of producing the top three likely classes that a line could belong to, along with a score for each class. The normalization process can be as simple as taking the absolute scores and translating it to relative scores between the classes so that users can know, for example, how far apart they are. If the classes are clustered too close to each other, then it may be desirable to wait to get confirmation from another model stack prior to confirming a classification. If the classes are far apart but this is a high information uncertainty case, it again may be desirable to wait for confirmation. If the classes are far apart and this is a low information uncertainty case, the top match simply may be used as the classification.

Figure 5:
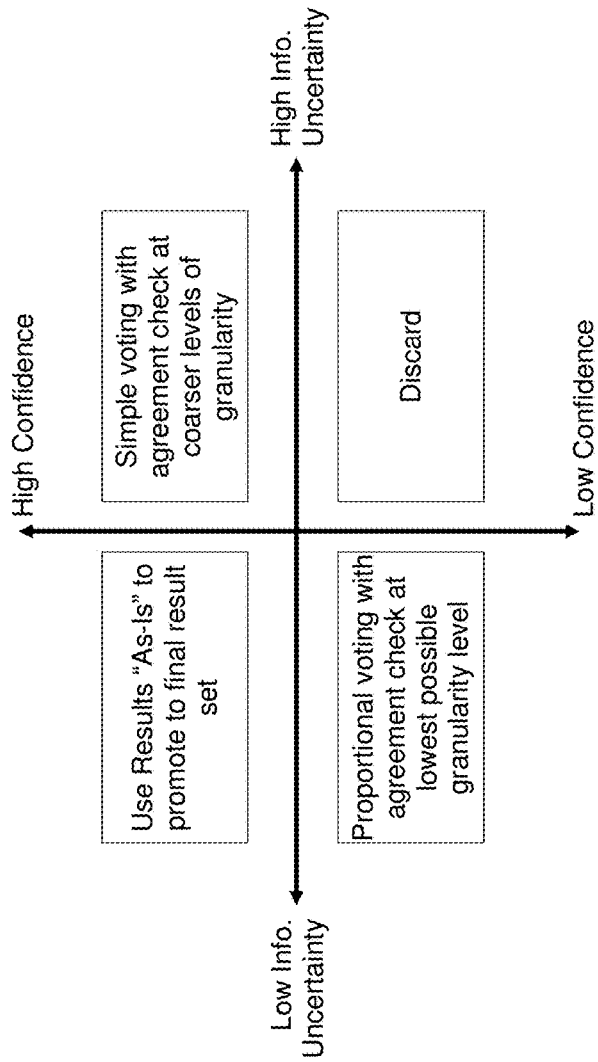
FIG. 5 is a schematic view of how an adaptive ensemble technique may operate under different circumstances, in accordance with certain example embodiments.

FIG. 5 is a schematic view of how an adaptive ensemble technique may operate under different circumstances, in accordance with certain example embodiments. The circumstances covered in the FIG. 5 example include a continuum for the level of information uncertainty (represented by the x-axis), and a continuum for the level of confidence (represented by the y-axis). The technique may in certain example embodiments progress from the upper-left quadrant to the lower left quadrant to the upper right quadrant to the lower right quadrant. As will be appreciated from FIG. 5, in the cases where the model stacks are operating in low information uncertainty environments, the example technique may not wait to ensemble; rather, it simply may promote the high-confidence matches of the first model stack into the final result set.

When dealing with low confidence matches in low information uncertainty zones, different models may be ensembled in a way that reflects their probability of being correct. For example, with vector space model (VSM) clustering (e.g., of the type described in greater detail below), the top three classifications with their computed probability values may be considered as input into the ensemble, along with classifications from other models. A simple voting scheme need not be followed. Instead, the number of votes assigned to each classification may be a function of the probability of that answer being correct as computed from confidence models (e.g., a form of proportional voting). A final answer may be derived from agreement at granular levels of classification (e.g., class or commodity level in the UNSPSC taxonomy, for instance). If the proportional voting is inconclusive, classification may not be performed in this zone but, instead, the line items may be forwarded into the next zone of processing.

When dealing with high confidence matches within high information uncertainty zones, relevant model stacks may be executed, and their high confidence matches may be collated. These records may be combined with the matches from the unprocessed records from the previous zone of processing. All of these records then may be ensembled through a simple voting mechanism, but the voting may be counted at a higher (coarser) level of granularity. Majority agreement across different classifiers at higher levels of granularity may drive the final classification in this zone of operation. Records without sufficient agreement as well as low confidence records in this zone may be discarded without having a classification assigned.

One challenge for the auto-classification system operating in high information uncertainty zones is that simple models may fail to capture the complexity of problem space. This problem may be solved in certain example embodiments by combining the outputs of a set of classifiers (e.g., model stacks) that are somewhat uncorrelated with each other. This way, between them, there is a way to "work through the fog" and still get to a classification, albeit at coarse level of granularity.

Supervised learning experiments may help to instrument and baseline model stack performances in various situations, and the results may be stored in the model registry. The model registry (with associated weights for specific situations) may help guide the cadence of model stack execution in an information uncertainty aware manner.

The self-learning approach taken by the auto-classification system in certain example embodiments may be thought of as a solution that helps minimize or otherwise reduce systemic information uncertainty. One way the auto-classification system may be self-learning is that it may help update the reference data that is used to power the classification. For instance, depending on the model stack that is invoked and used in an auto-classification system run, the system may be configured to generate new data for its reference universe. This may be through of as enhanced training data. For example, supplier and item universes may automatically update themselves after every run, whereas context universes may require or otherwise benefit some curation from domain experts. The fact that the system has more reference data to work with after each run may help reduce one of the major sources of information uncertainty.

As mentioned above, one way to reduce systemic information uncertainty involves making model stacks more fine-grained for poorer data qualities. This may be accomplished by increasing the number of uncorrelated classifiers (model stacks), as well as performing new feature extraction for the model stacks to operate upon. As both of these may happen in supervised learning situations, the model registry may be updated with this information. Based on the weights set out in the registry, the auto-classification system may automatically learn to invoke and ensemble with new versions of the model stacks. The model update module 212 shown in FIG. 2 may be used for these and/or other purposes.

The following description relates to an example of a model and model stack that may be used in connection with certain example embodiments. More particularly, the example model involves clustering based on a vector space model and specifically operates on features including name and description which, consistent with the example scenario discussed herein, could be from a PO or AP file. Further, this model makes use of the UNSPSC classification schema, with the following classification groups: Level 1: Segments, Level 2: Families Level 3: Classes, and Level 4: Commodities. In general, the approach underlying this model involves modelling each classification level as a "weighted bag of words." That is, every level in the hierarchy is associated with a set of weights (numbers between 0 and 1) relative to a learned dictionary of words. More formally, a classification level is represented as a vector within an n-dimensional (N-D) vector space, where n is the number of words in the learned dictionary. The classification problem is then solved by representing an incoming new item (query) as another point in N-D space and assigning it to its "nearest neighbor." The angular separation between the vectors (computed through the vector dot product) is the distance measure used in this example. A larger dot product score indicates a higher rank or closeness to a classification-group vector.

The approach used in this example model is somewhat similar to k-means clustering (which itself may be used as a model in certain example embodiments). As is known, k-means clustering is unsupervised in that incoming data is automatically sorted into clusters each having a centroid. Clusters do not have an a priori meaning in traditional k-means clustering. In contrast, the approach used in this example model involves mapping out these centroids, with each N-D point representing one instance of a category level. The N-D centroids are assigned a priori, e.g., through the result of machine learning applied on top of a training data set (that has category labels associated). The example approach then reduces the incoming data into N-D points and allows them to cluster around the pre-assigned centroids. The distances between these points and the various assigned "centroids" are calculated, and class membership is assigned based on closest distance.

A corpus of curated data from various sources may be used as a training dataset. These sources provide labels (in this case categories) associated with the data. The labels may be added at the source, via crowd-sourcing, by application of domain-specific knowledge by experts, etc. The data sources are normalized and standardized through a supervised automation process to arrive at "category level documents" that then serve to represent specific term concentrations for that document. These documents serve as the input to the N-D centroid creation process. The transformation to "category documents" is performed at all four levels of UNSPSC. For example, assume that there is a data for a given category (L3) from various sources. Certain example embodiments may first obtain all the documents in lower case, remove stop words (like "the", "of", etc.), remove numbers, etc. The words may be stemmed using known data processing techniques (e.g., where "swimming" and "swimmer" becomes "swim"), and the remaining words for the category may be deduplicated. Whatever remains can be inserted into a document as a good representation of that category, e.g., as the category level document.

A dictionary of unique terms across the training corpus is created (by using ALL category documents). The total number of unique terms in the dictionary is denoted as N. Each category document is represented as a vector of N dimensions by having a weight associated against each of the N terms. One procedure for calculating weights will now be described.

First, calculate term frequency tf(t,d), where t is the term and d is the document in question. Denoting raw frequency of a term in a document, $f_{t,d}$, one variant that may be used is:

$$tf(t,d) = \sqrt{f_{t,d}}$$

Then, the inverse document frequency idf(t) is calculated as:

$$idf(t) = 1 + K/\log(|\{d \in D : t \in d\}| + 1)$$

where K represents the total number of documents in corpus, D represents corpus (i.e., the set of all of documents d), and $|\{d \in D : t \in d\}|$ represents the number of documents containing term t.

Each document Di is represented as an N-dimensional vector, as follows:

$$d_k(i) = tf(t_i, d_k) \times idf(t_i)$$

where $d_k(i)$ represents $i^{th}$ element of $k^{th}$ document, $\forall i \in [1, N]$ and $\forall k \in [1, K]$, and $t_i$ represents $i^{th}$ term in the dictionary (of N words).

Each line in the incoming data is translated to N-D vector by using the same procedure mentioned above. This is done for all of the lines in the incoming dataset. If the total number of lines in incoming dataset is represented as J, each line within the dataset can be represented as a point vector $Vj \forall j \in [1,J]$. Each point's distance from a defined N-D "centroid" $Vc \forall c \in [1,C]$, is then calculated as:

$$Vj \cdot Vc / |Vj| * |Vc|$$

where C represents the total number of "categories" in a given run.

The distance measures are compared for a given level in UNSPSC, as well as across levels. This is done because category collision is a possibility but it occurs at different levels depending on the composition of the training set.

Figure 6:
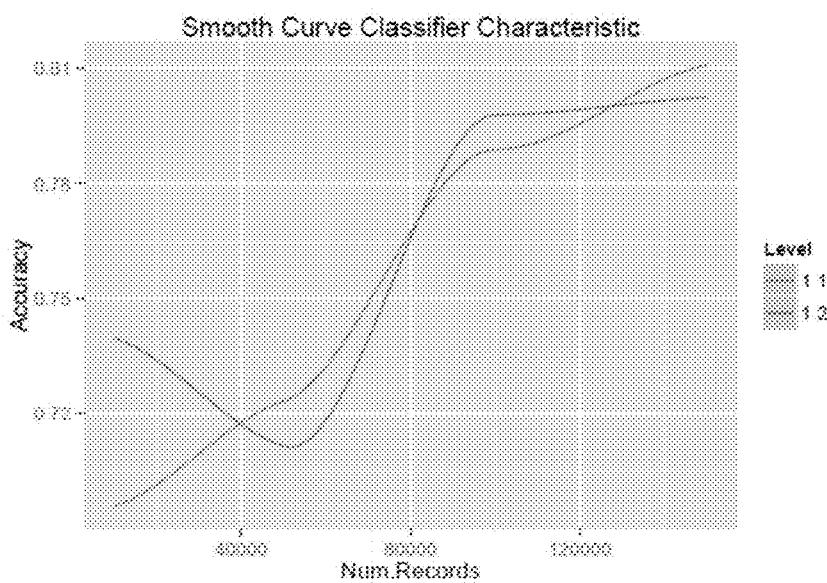
FIG. 6 is a sample distribution of classification performance with a sparse training set used for an example vector space model (VSM) clustering approach suitable for use in certain example embodiments.

Performance of this VSM clustering based classifier has been found to be very dependent on the composition of the training set. A sample distribution of classification performance with a sparse (i.e., single source) training set is provided in FIG. 6. Performance characteristics become more nuanced and change as the training set composition is altered through experience, crowdsourcing, etc.

The structure of the VSM clustering algorithm is that it will provide the top three likely classes that a given line item would fall under. If the classifier is operating within its zone of expertise, the top match is likely to be a correct classification. If the classifier is operating in an area of high information uncertainty, it will still provide three (or fewer) matches, but they are unlikely to be correct. Using this classifier as-is may bring with it the risk of inaccurate classifications in areas that lie outside its specialization (e.g., in areas of sparse training examples).

To reduce the risk associated with the classification output, the output of the VSM clustering may be stacked with another binary classification model. In this example, a family of Bayesian generalized linear classification model (BGLM) is used (although different example embodiments may use other models together with, or in place of, the BGLM).

Figure 7:
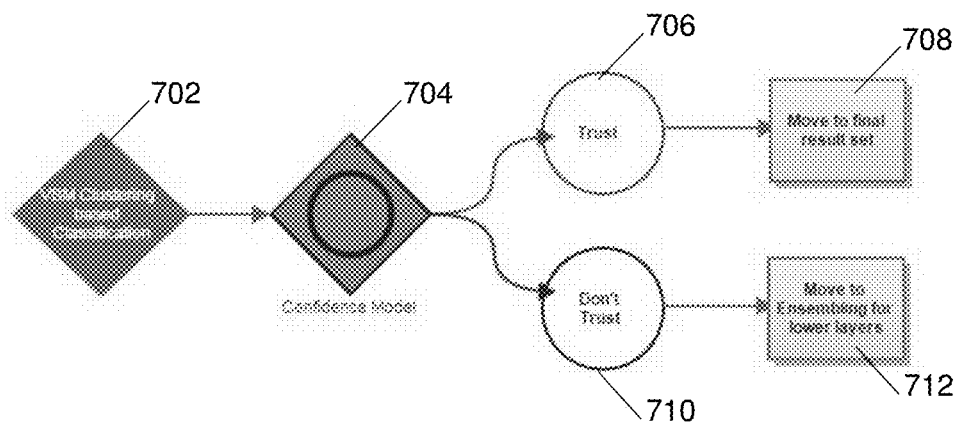
FIG. 7 is a schematic of a model stack that may be used in connection with certain example embodiments.

The BGLM operates on a problem space that combines the VSM clustering output with the reference universe profile. The FIG. 7 schematic diagram illustrates the operation of this model stack. As shown in FIG. 7, the VSM clustering classification 702 output is fed into a confidence model 704. The confidence model is, in essence, the BGLM being used to provide a "classification confidence" readout on top of the VSM clustering output. A decision as to whether to trust the output is then made (e.g., based on the classification confidence). If the output is to be trusted as determined in block 706, then it is moved to the final result set as indicated in block 708. On the other hand, if the output cannot be trusted as determined in block 710, then it is moved for ensembling for lower layers as indicated in block 712.

The BGLM classifier basically provides the value of following:

$$p(\text{class}(B_{ij})=C_k:x_1, \ldots, x_n)$$

which is the probability of the jth line item of processing bucket $B_i$, being a part of class $C_k$ (i.e., the correct class assignment) given the respective values of predictors $x_1 \ldots x_n$. Thus, the BGLM provides the probability of the top match from the VSM clustering classification being correct for $B_{ij}$.

The predictors used in this model may include:
Best Class Distance Score from VSM Clustering
2nd Best Class Distance Score from VSM Clustering
3rd Best Class Distance Score from VSM Clustering
Context profile availability for predicted category Ck
Supplier universe strength for predicted category Ck
Item universe strength for predicted category Ck
Known vs. unknown supplier associated with line item $B_{ij}$
Raw input related features Given the large number of classes in the UNSPSC scheme (i.e., the large k in Ck), a single BGLM not likely to capture the nuances of the problem space without including a large (and potentially unwieldy) number of predictor variables. Another option is to train more complex binary classifiers that use various layers of abstraction that can suitably learn the category specific nuances. Another solution that may be employed is to use a family of BGLM models (instead of a single model) that includes models of the same overall structure but with different model parameters. These model parameters may be obtained from supervised learning at a specific category level. Taken together, these models may provide complete coverage over the problem space.

Going back to the formulation, the VSM clustering model provides top three likely matches and the related scores. Based on the category of the top match, the parameters of the related BGLM are retrieved, and the value of p(class (Bij)=Ck: x1, . . . ,xn) is calculated. This probability value is then compared against a category specific threshold Tk (which may in certain example embodiments be learned from same supervised learning experiments that finalize parameters of category specific BGLM). The threshold and the probability value then may be used together in the following manner:

If $p(\text{class}(B_{ij})=C_k:x_1, \ldots, x_n)>T_k$,

Predict 1 // i.e., trust
Else Predict 0 // i.e., don't trust)

The line items that exceed their probability thresholds are considered high confidence matches in the context of this model stack, and the ones less than or equal to threshold are considered "other" matches. The high confidence line items thus may be promoted into the final result set, whereas the remaining ones may be forwarded on to lower quality buckets for processing (with the calculated probability values intact). This is as reflected in, and noted above in connection with, FIG. 7.

Figure 8:
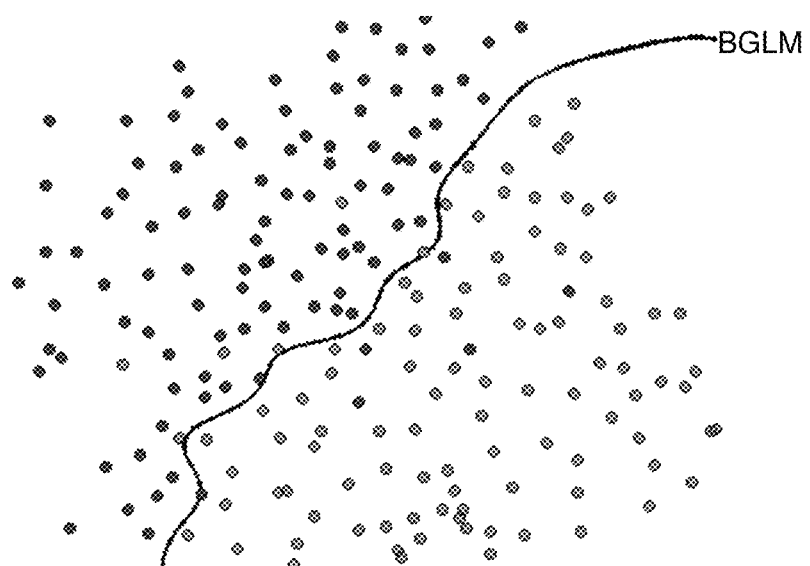
FIG. 8 is a sample illustration of a decision boundary that separates the zone of competence (the lighter dots at the bottom right of the illustration) from rest of the problem space.

The BGLM family in this model stack helps to learn the "decision boundary" that separates zones of high performance from zones of low performance for the upstream VSM clustering classifier. Every line item classification may be passed through this confidence filter to determine whether the result lies in the area of the classifier's competence. If so, the result is used. If not, the corresponding result is forwarded on to be processed with other similar weak signals to get to final classification. This is shown visually in FIG. 8, which is a sample illustration of a decision boundary that separates the zone of competence (the lighter dots at the bottom right of the illustration) from rest of the problem space. The line is indicative of the BGLM family boundary.

In view of the foregoing, it will be appreciated that certain example embodiments provide a classification model stack including (a) a plurality of classification models, (b) a plurality of confidence models, and (c) a related multi-level taxonomy of classifications applicable to line-item data entries included in documents received via the input interface. Classification models from the classification model stack can be executed to associate line-item data entries included in received documents with potential classifications at each level in the related taxonomy. Confidence models from the classification model stack can be executed to assign probabilities of correctness for each potential classification generated by execution of the classification models. For each of the line-item data entries, the most granular level of potential classification that meets or exceeds a threshold value may be determined, and the classification result corresponding to the determined most granular level of potential classification may be assigned for each of the line-item data entries included in the documents received via the input interface.

Some or all of the classification models may VSMs, and some or all of the confidence may be BGLM. For example, the confidence models may comprise a family of different Bayesian generalized linear classification models.

The dimensionality of a classification space in which the classification models operate may be confined by executing a series of progressively narrower classifications. For example, the series of progressively narrower classifications may include an executable deterministic category model and/or an executable natural language processing noun modifier model, followed by a vector space model.

With respect to a deterministic category model, for example, historical auto-classification results may capture input line-item data and their corresponding classifications, which in turn may be arrived at by using certain attributes/features of interest. Knowing the correct category assignments for a line item may allow the auto-classification system to learn relationships between values of unused attributes/features in line-item data and the classification result. This learning may manifests itself as a deterministic rule that is evolved over time, which can then be employed to classify other data sets. This is an example self-learning mechanism that may be used in connection with certain example embodiments. As an example, line items that were confidently classified on the basis of names and or description attributes potentially provide certain example embodiments with the ability to learn deterministic rules between Vendor (one of the unused attributes of line item data) and classification result.

With respect to a natural language processing (NLP) noun modifier model, such a model may involve performing a natural language pre-processing operation termed "POS Tagging" or Part Of Speech tagging on datasets, e.g., to segregate nouns and their modifiers. A dictionary of nouns and their associated problem space region (treated, for example, as clusters of categories that they might indicate), may be built up by training the model on labeled and well-attributed datasets. The nouns may be similarly extracted from incoming client data and matched to dictionaries learned from training. The match values may be used to reduce the dimensionality of the problem space for other models (e.g., a VSM). These latter models may work within the constrained problem space to arrive at the target classification.

Voting may be used to resolve disagreements between potential classifications derived by execution of the classification models. For example, at least one of the confidence model that involves voting may be practiced using (a) simple majority-rules voting on potential classifications made at each level of the related taxonomy for each of the line-item data entries; (b) proportional voting on potential classifications for each of the line-item data entries (e.g., with the proportional voting weighting more granular potential classifications more heavily than less granular potential classifications); and/or the like.

It will be appreciated that the classification models from the classification model stack may associate each of the line-item data entries with multiple potential classifications at each level in the related taxonomy. In this regard, and similar to the above, proportional voting on the multiple potential classifications for each of the line-item data entries may be used to resolve disagreements between potential classifications and, optionally, the proportional voting may weight potential classifications based on their ordering such that each successive potential classification is weighted less than the preceding potential classification.

It will be appreciated from the described above that auto-classification involves, in essence, putting "messy" data into configurable and changeable buckets, with reference to a mapping structure, and through the use of models and/or model stacks. These buckets are changeable over time, e.g., as multiple classifications can be used, models can be adapted, etc. Classification algorithm results can be intelligently aggregated over time to generate multiple sets of buckets, to determine the best set of buckets to be used for a given classification, and/or for a given data type. Buckets may be hierarchical, e.g., in accordance with a related taxonomy. Different models run on the same data set may be confident of classification results at different levels, and a given model may be confident of classification results at different levels of granularity at different levels. Aggregating across models may over time suggest a best set of buckets to be used.

As the categories get more and more generic (e.g., higher levels in UNSPSC hierarchy), the number of possible attributes for an item become progressively larger. Referring once again to FIG. 1 and the description provided above, it will be appreciated that auto-classification (step 106) provides the most granular categorization possible. This is used to retrieve the attribution (the relevant attributes) from the attribute database (step 108), which may be thought of as being a part of the item universe. The result of this retrieval helps indicate which attributes about the item in question are mandatory to know, and which ones are simply "nice to have" when it comes to importing that data. For instance, attributes relevant to printer paper typically will be different from those relevant to natural gas. The attribute database provides such information, and different sub-levels may inherit the attributes of their parent level(s). The database itself may be built using a combination of supervised and unsupervised learning algorithms (e.g., as taught elsewhere in this disclosure).

Once these attributes are identified, they may be prepopulated intelligently (step 110). For example, the combination of various unstructured text processing algorithms and parsing techniques may be employed to derive the values of relevant attributes from the incoming imperfect descriptions. Other pre-processing steps to aid in search space reduction may be performed here, as well.

The intelligent attribute pre-population oftentimes will resolve the incoming text into a few attribute values and some unresolved text. This operation may be thought of as filling in attribute information based on data that already is known. Rule-engine powered item universe searching (step 112) may use available information to match an incoming line-item against the item universe, e.g., using the rule engine 214 and the item store 210a. The rule engine 214 includes heuristics related to searching for identifying information across various fields, with different rules having varying levels of importance. The output of this operation may include a set of nearest records from the item universe that match attributed item. With respect to the rule engine 214, if, for example, the description in an incoming line item has a manufacturer's part number or a piece of it, the intelligent pre-population step will discover it. This field is a strong search field in certain example embodiments, so the rule engine 214 may have a rule that says, if a manufacturer's part number (full or partial) is provided, that rule is to be given the max weight and needs to be run first. Subsequent rules will operate on results from applying this rule. A rule mark-up language may be used to represent the rules themselves, and they may be stored to a rule repository or the like. The information stored may be based on the type of rule in some cases. Basic rule attributes may include: rule ID, name, type, weight, a run in parallel or in sequence flag, field(s) of operation, etc.

Intelligent match resolution (step 114) then may be performed. Based on the rules were used to match the records in the previous operations, weights may be assigned to each of matching records. These weights may be computed differently for different rules. A set of classifiers as well as empirical rules then may be used to determine the confidence of the match across different records. In this regard, confidence values may be used as a guide to perform automated matching. Matching also is nuanced in that even if a query record is unable to be matched with an item universe record in its entirety, it nonetheless may be matched at the attribute and other level(s) within the defined search space.

If the previous step resulted in match against an existing item universe record (e.g., as determined in step 116), there is resolution to an item universe record (step 118) and values for the attributes may be pulled up from the match and returned (step 120). If the match occurred at a partial level, the attribute values from the partial matches are extracted, collated along with the results from step 110 and returned. The enrichment of the record then is complete (step 122).

On the other hand, if there is no complete or partial match against an existing item universe record (e.g., as determined in step 116), a search is performed on curated data sources and results are filtered (step 124). It is noted that unstructured data sets that are tagged by category are maintained within item universe. A query is formulated based on results from step 110 and is run against the unstructured but categorized data sets. A set of potential matches typically will be produced as a result of this querying. However, if no matches result, the search may be repeated on public domain information sets, and the promising matches may be tagged, extracted into a basic format that resembles the "unstructured item universe" data, and then that information may be used as the output of this step. Regardless, intelligent match resolution (step 126) and intelligent attribute population (step 128) similar to that described above may be performed.

Based on the confidence of matches, a manual verification (step 130) may be desired and performed. For example, category experts may review the data and determine if the matches are usable. The decision criteria then may abstracted as a heuristic rule and be assigned a relative weight in the context of existing rules.

In a related regard, an item universe update (step 132) may occur. That is, the manual verification (step 130) typically will yield a matching item, and the item universe data standards may be applied (e.g., to ensure that minimum levels of attributes with values exist for the matches) to the item, and the resulting gaps (if any) may be filled through an assisted process. The new record ultimately may be pushed into the item universe (step 132). Enrichment then may be considered complete (step 122), as above.

Figure 9:
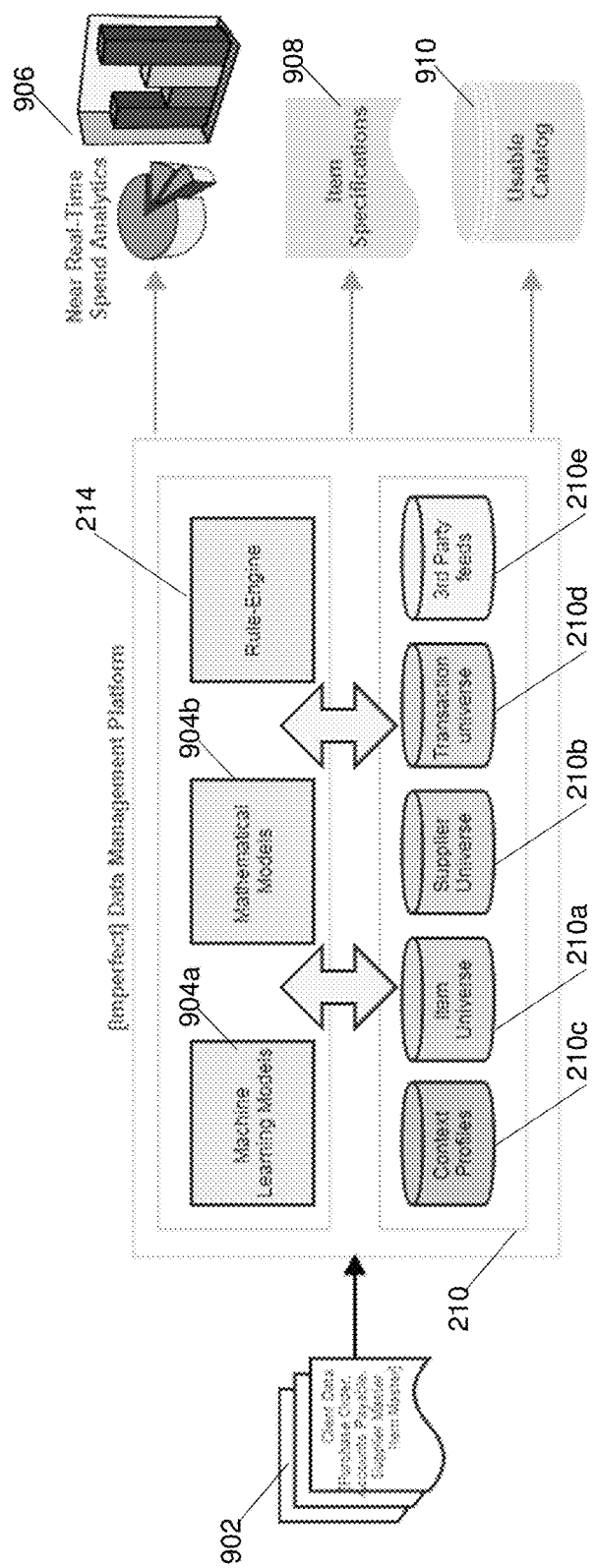
FIG. 9 is a block diagram of an imperfect data management technology platform being used in the procurement example context, in accordance with certain example embodiments.

It will be appreciated that the imperfect data management technology platform as described herein has a number of different applications across various usage contexts. Several examples within the more specific procurement context will now be discussed, e.g., in connection with the FIG. 9 block diagram. As can be seen from the FIG. 9 block diagram, the imperfect data management technology platform operates on inputs 902 that are freely available from most if not all ERP systems (e.g., regardless of ERP OEM). The reference universe 210 including the various stores 210a-210e are shown in FIG. 9, as are the rule engine 214 and various models 904a-904b, which may variously correspond to the models 204a-204n discussed above in connection with FIG. 2.

The outputs enabled by this platform solution correspond, at least in part, to the core user-facing products 216 shown in FIG. 2. In the FIG. 9 example, a near real-time spend analytics module 906 serves to give procurement teams (e.g., buyers, category managers, strategic sourcing professionals, etc.) a bird's eye view of spend flowing through their enterprises. Procurement professionals may be able to identify high spend areas as well supplier fragmentation/penetration within hours and minutes of providing the data (e.g., instead of weeks and months that conventional solutions take).

As another example output, a detailed and granular catalog is a building block for procurement teams to control spending and create savings on an ongoing basis. Getting to a usable catalog 910 conventionally is a long, drawn-out process that ordinarily takes several months and employs an error-prone manual process. Certain example embodiments are able to collapse the time to this value to hours, e.g., when the example techniques described herein are used. In a perhaps related vein, the efficacy of strategic sourcing and other types of buying activities oftentimes are greatly influenced by the level of information available on the item being sourced/bought. Certain example embodiments provide as an output a detailed item specifications listing 908 that can be used directly as the basis to quote out RFXs.

In this case study, not having usable spend data relegates procurement teams to playing a tactical role or to being in a perennial catch-up mode when it comes to maintaining data quality. Certain example embodiments remove roadblocks and empower procurement teams to view and address their enterprises' spending strategically.

Figure 10:
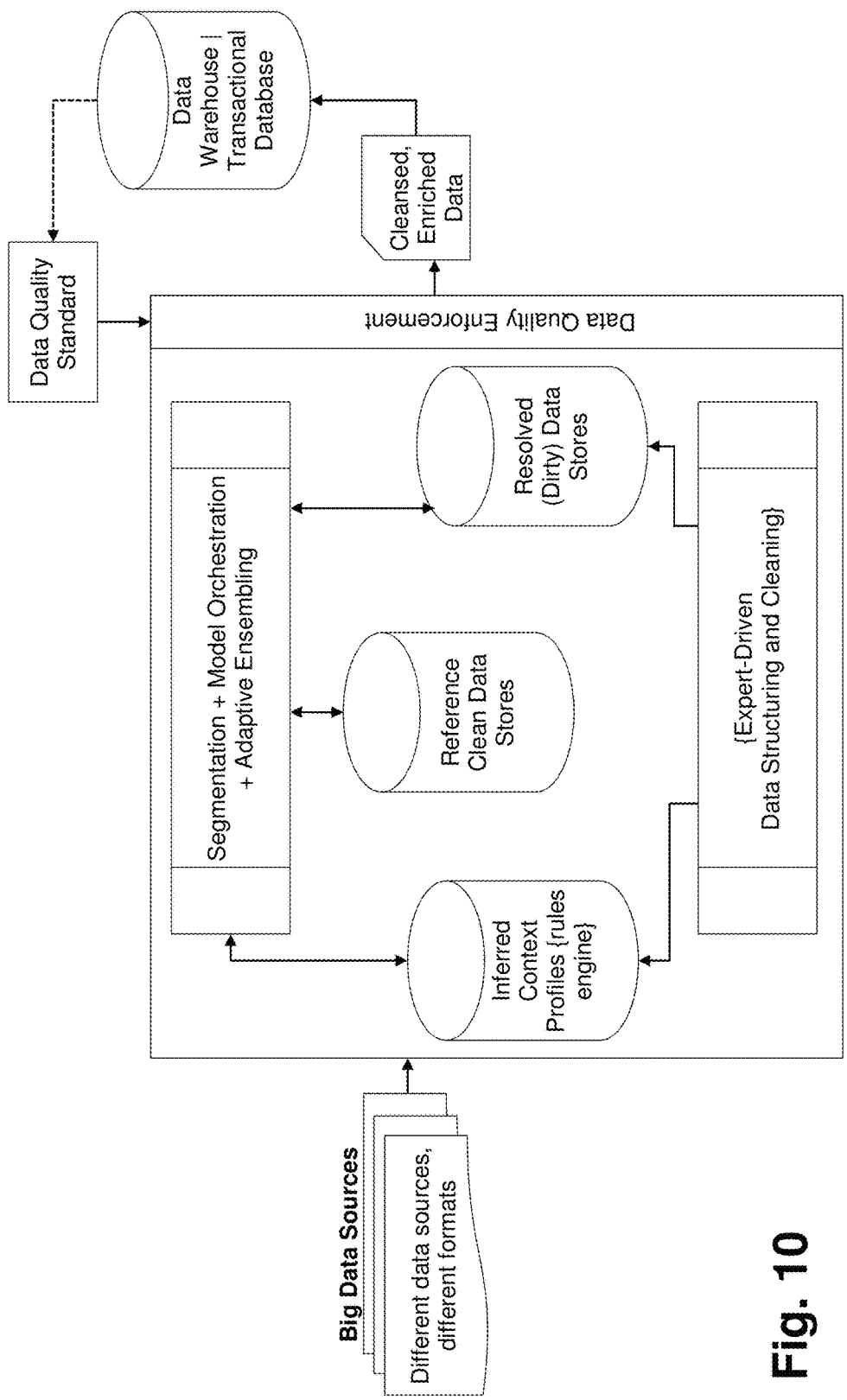
FIG. 10 is another block diagram showing example components of an imperfect data management platform that may be used in connection with certain example embodiments.

FIG. 10 is another block diagram showing example components of an imperfect data management platform that may be used in connection with certain example embodiments. The structure and function of the elements of the FIG. 10 diagram will be understood by those skilled in the art, e.g., in view of the description above and the claims below.

In view of the foregoing, it will be appreciated that certain example embodiments relate to a data analysis system, comprising: an electronic interface configured to receive client data, the client data including spend data; a spend analytics module configured to enable authorized users to view aspects of the flow of spend through an organization, using the data analysis system; an electronic catalog of products and/or services usable and/or used by the organization; and processing resources including at least one processor and a memory operably coupled thereto. The processing resources are configured to: store information about items, suppliers, and transactions, received over the electronic interface; store context profiles that involve domain know-how and attributes for products and/or services; apply one or more model stacks to incoming client data elements related to products and/or services usable and/or used by the organization, with the one or more model stacks automatically classifying each one of these incoming client data elements in accordance with a predefined taxonomy; enrich the client data elements with additional attributes, as enabled by the automatic classification; and generate and/or maintain the electronic catalog in accordance with the client data elements that have been automatically classified and enriched. According to certain example embodiments, client data may be receivable from an external enterprise resource planning (ERP) system. For instance, client data receivable from the external ERP system may include purchase order and/or accounts payable information. Also, according to certain example embodiments, the spend analytics module may be configured to generate for output one or more reports related to high spend areas, supplier fragmentation, and/or supplier penetration, for the organization. Corresponding methods, computer readable storage mediums tangibly storing instructions for executing such methods, and/or the like also are contemplated.

In certain example embodiments, a data classification system is provided. An input interface is configured to receive documents comprising data entries, with at least some of the data entries having associated features represented directly in the documents. A data warehouse is backed by a non-transitory computer readable storage medium and configured to store curated and classified data elements. Processing resources, including at least one processor and a memory, are configured to at least execute a classification model stack having a first classification model and a related taxonomy of classifications on data entries included in documents received via the input interface, with the first model being configured to associate the data entries included in the documents received via the input interface with classification results that match with the related taxonomy. This includes having each level in the related taxonomy associated with a set of weights relative to a learned dictionary of words from a training dataset, such that each category in each level in the related taxonomy is represented as a vector within an n-dimensional (N-D) vector space, where n is the number of words in the learned dictionary; and for each data entry: representing the respective data entry as a vector in the N-D vector space; identifying a predetermined number of nearest neighbors to the vector (e.g., 3), using angles as distance measures between the vector and neighbors; and associating the respective data entry with the classification result corresponding to one of the identified nearest neighbors. Each data entry is stored, with or without additional processing, to the data warehouse, in accordance with its associated classification result. Records in the data warehouse are able to be queried from a computer terminal. N-D category vectors are learned a priori from the training data set. Corresponding methods, computer readable storage mediums tangibly storing instructions for executing such methods, and/or the like also are contemplated.

According to certain example embodiments, the classification model stack may include a second classification model, with the second classification model operating on output from the first classification model and defining a confidence level for each of the identified nearest neighbors. For example, the second classification model may produce a binary output indicative of whether output from the first classification model is trustworthy. The second classification model may be a Bayesian generalized linear classification model. Predictors used by the second classification model may include distance measures from the first classification model and/or system-provided information about the related taxonomy.

According to certain example embodiments, the classification model stack may include a plurality of second classification models, with each second classification model operating on output from the first classification model and defining a confidence level for each of the identified nearest neighbors.

According to certain example embodiments, angles may be used as distance measures by taking the dot products of the vector and the neighbors and dividing by the product of the respective Euclidean norms.

According to certain example embodiments, the first classification model may be self-learning, e.g., with successive classifications, by treating words associated with successive classifications as further reference data for use in the training dataset, and/or the like.

It is noted that the input interfaces described herein may involve, for example, importing files into standalone executable software application, reading files from disk or another storage location, interfacing with external procurement software or other databases, uploading to a web-based app, etc.

It also is noted that certain example embodiments may involve the data warehouses storing curated and classified data elements. The curated information in certain example embodiments may include stored, pre-classified datasets that are usable as training data for the models, e.g., where the category labels are known for constituent records.

Although certain example embodiments have been described in terms of procurement or "spend" data, it will be appreciated that the techniques described herein can be used in connection with other use cases, data sources, and/or the like. For example, the techniques described herein may be used in connection with computer-assisted coding in healthcare situations, knowledge creation from unstructured data elements separate from a traditional IT system, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data classification system, comprising:
an input interface configured to receive documents comprising data entries, at least some of the data entries having associated features represented directly in the documents;
a data warehouse backed by a non-transitory computer readable storage medium and configured to store curated and classified data elements;
a model registry storing a plurality of different model stacks, each model stack including at least one classification model and at least one confidence model that is separate from the at least classification model in the respective model stack; and
processing resources including at least one processor and a memory, the memory storing instructions, the instructions being executed by the at least one processor to at least:
 inspect documents received via the input interface to identify, as heterogeneous input data, data entries and associated features located in the inspected documents;
 segment the heterogeneous input data into different, respectively homogenous processing groups, the different processing groups having associated levels of information uncertainty;
 for each different processing group, starting with the processing group associated with a lowest level of information uncertainty and moving upwardly:
  (a) identify one or more model stacks from the model registry to be executed on the respective processing group;
  (b) execute each identified model stack on the respective processing group to arrive at a classification result and a confidence level for each data entry in the respective processing group using the classification and confidence models in the respective model stack, wherein classification results map features from the data entries to predefined concepts associated with the classification models;
  (c) ensemble results from the execution of each identified model stack, using the classification results and the confidence levels, to group the data entries in the processing group into one of first and second classification type groups, the first classification type group corresponding to a confirmed classification and the second classification type group corresponding to an unconfirmed classification;

(d) move each data entry in the first classification type group to a final result set; and (e) for the second classification type group:
determine, for each data entry in the second classification type group, the processing group from among those processing groups not yet processed that is most closely related to it; and
move each data entry in the second classification type group to the corresponding determined most closely related processing group;

once all of the different processing groups have been processed in accordance with (a) through (e), treat as unclassified any data entries remaining in the second classification type group;

store each data entry in the final result set, with or without additional processing, to the data warehouse, in accordance with the corresponding arrived at classification result; and reference records in the data warehouse in response to queries from a computer terminal.

2. The system of claim 1, wherein the processing resources are further configured to at least:
identify and tag related records across the input data; and
for the first classification type group:
retrieve, for data entries of the first classification type group, related data entries across received documents;
assign an inferred classification result to each retrieved related data entry; and
also move each retrieved related data entry having an assigned inferred classification result to the result set.

3. The system of claim 1, wherein at least some of the model stacks include classification and confidence models that are different from one another.

4. The system of claim 3, wherein at least one of the model stacks includes a vector space model as the classification model thereof and a family of Bayesian generalized linear models as the confidence model thereof, the family of Bayesian generalized linear models being configured to assign confidence levels to classification results output from the vector space model.

5. The system of claim 4, wherein the classification results are structured to comport with at least one predefined taxonomy.

6. The system of claim 1, wherein the classification results are structured to comport with at least one predefined hierarchical taxonomy.

7. The system of claim 1, wherein the data warehouse is a transactional database.

8. The system of claim 1, wherein the ensembling is performed as a function of a level of information uncertainty and a confidence level.

9. The system of claim 8, wherein the ensembling produces classification results without combining the output from multiple model stacks in response to a first executed model stack producing an intermediate classification result with a high confidence level while operating with a low level of information uncertainty.

10. The system of claim 8, wherein the ensembling produces classification results without combining the output from multiple model stacks in response to a first executed model stack producing an intermediate classification result with a confidence level above a first threshold while operating with a level of information uncertainty below a second threshold.

11. The system of claim 8, wherein the ensembling produces classification results based on a form of proportional voting in response to the executed model stacks producing intermediate classification results with low confidence levels while operating with a low level of information uncertainty.

12. The system of claim 11, wherein the form of proportional voting includes assigning votes to at least some of the top intermediate classification results from each executed model stack, the votes being weighted based on the confidence levels associated with each of these top intermediate classification results.

13. The system of claim 11, wherein the form of proportional voting produces the classification result for the ensembling, provided that there is agreement among the model stacks at one or more lower levels of classification in a taxonomy of classifications.

14. The system of claim 13, wherein the ensembling produces classification results based on a form of simple majority-rules voting in response to there not being agreement among the model stacks at the one or more lower levels of classification in the taxonomy of classifications.

15. The system of claim 14, wherein the change from proportional voting to simple majority-rules voting occurs with successive processing groups that operate at high levels of information uncertainty.

16. The system of claim 8, wherein the ensembling produces classification results based on a form of voting in response to the executed model stacks producing intermediate classification results with high confidence levels while operating with a high level of information uncertainty.

17. The system of claim 16, wherein the form of voting includes assigning votes to each intermediate classification result, the voting producing the classification result for the ensembling on a majority-rules basis, provided that there is agreement among the model stacks at one or more higher levels of classification in a taxonomy of classifications.

18. The system of claim 8, wherein the ensembling produces classification results:

(a) without combining the output from multiple model stacks in response to a first executed model stack producing an intermediate classification result with a high confidence level while operating with a low level of information uncertainty;

(b) based on a form of proportional voting in response to the executed model stacks producing intermediate classification results with low confidence levels while operating with a low level of information uncertainty, provided that there is agreement among the model stacks at one or more levels of granularity in a taxonomy of classifications; and (c) based on a form of simple majority-rules voting, (i) in response to part (b) failing, and (ii) in response to the executed model stacks producing intermediate classification results with high confidence levels while operating with a high level of information uncertainty.

19. The system of claim 1, wherein the identification of the one or more model stacks from the model registry is based at least in part on a level of information uncertainty and/or historical model performance.

20. The system of claim 1, wherein at least some of the model stacks are self-learning such that confidence levels for classification results tend to increase over time.

21. The system of claim 20, wherein at least some of the self-learning model stacks self-learn by having the processing resources coordinate updates to reference or other training data to increase a likelihood of future classifications being correct.

22. The system of claim 20, wherein at least some of the self-learning model stacks self-learn by having the processing resources make the respective self-learning model stack more fine-grained for poorer data qualities by increasing a number of uncorrelated classifiers and/or extracting new features for the respective self-learning model stack to operate on.

23. The system of claim 22, wherein the self-learning is supervised.

24. The system of claim 1, wherein the processing groups are arranged in descending order of data quality and ascending order of information uncertainty.

25. The system of claim 1, wherein the segmentation of the input data into different processing groups is based at least in part on features associated with the input data.

26. The system of claim 25, wherein the segmentation of the input data into different processing groups is further based in part on one or more predefined context profiles, the context profiles identifying categories for the segmentation.

27. A data classification method for use with a data warehouse backed by a non-transitory computer readable storage medium and configured to store curated and classified data elements, the method comprising:
  receiving, over an input interface, documents comprising data entries, at least some of the data entries having associated features represented directly in the documents;
  having a model registry storing a plurality of different model stacks, each model stack including at least one classification model and at least one confidence model that is separate from the at least classification model in the respective model stack;
  inspecting, using processing resources including at least one processor and a memory, documents received via the input interface to identify, as heterogeneous input data, data entries and associated features located in the inspected documents;
  segmenting, using the processing resources, the input data into different, respectively homogenous processing groups, the different processing groups having associated levels of information uncertainty;
  for each different processing group, starting with the processing group associated with a lowest level of information uncertainty and moving upwardly, and using the processing resources:
    (a) identifying one or more model stacks from the model registry to be executed on the respective processing group;
    (b) executing each identified model stack on the respective processing group to arrive at a classification result and a confidence level for each data entry in the respective processing group using the classification and confidence models in the respective model stack, wherein classification results map features from the data entries to predefined concepts associated with the classification models;
    (c) ensembling results from the execution of each identified model stack using the classification results and the confidence levels, to group the data entries in the processing group into one of first and second classification type groups, the first classification type group corresponding to a confirmed classification and the second classification type group corresponding to an unconfirmed classification;
    (d) moving each data entry in the first classification type group to a final result set; and
    (e) for the second classification type group:
      determining, for each data entry in the second classification type group, the processing group from among those processing groups not yet processed that is most closely related to it; and
      moving each data entry in the second classification type group to the corresponding determined most closely related processing group;
  once all of the different processing groups have been processed in accordance with (a) through (e), treating as unclassified any data entries remaining in the second classification type group;
  storing each data entry in the final result set, with or without additional processing, to the data warehouse, in accordance with the corresponding arrived at classification result; and
  referencing records in the data warehouse in response to queries from a computer terminal.

28. A non-transitory computer-readable storage medium including instructions that, when executed by processing resources including at least one processor and a memory, are configured to at least:
  receive, over an input interface, documents comprising data entries, at least some of the data entries having associated features represented directly in the documents;
  inspect documents received via the input interface to identify, as heterogeneous input data, data entries and associated features located in the inspected documents;
  segment the heterogeneous input data into different, respectively homogeneous processing groups, each processing group having an associated level of information uncertainty;
  for each different processing group, starting with the processing group associated with a lowest level of information uncertainty and moving upwardly:
    (a) identify one or more corresponding model stacks from a model registry to be executed on the respective processing group, the model registry storing a plurality of different model stacks, each model stack including at least one classification model and at least one different and independent confidence model;
    (b) execute each identified model stack on the respective processing group to arrive at a classification result and a confidence level for each data entry in the respective processing group using the classification and confidence models in the respective model stack, wherein classification results map features from the data entries to predefined concepts associated with the classification models;
    (c) adaptively ensemble results from the execution of each identified model stack, using the classification results and the confidence levels, along with a processing group specific ensembler, to group the data entries in the processing group into one of first and second result type groups, the first result type group corresponding to a confirmed classification and the second result type group corresponding to an unconfirmed classification; and (d) move each data entry in the first result type group to a final result set; and
(e) for the second result type group:
   determine, for each data entry in the second result type group, the processing group from among those processing groups not yet processed that is most closely related to it; and
   move each data entry, and the associated classification results and confidence levels, in the second result type group to the corresponding determined most closely related processing group;
once all of the different processing groups have been processed in accordance with (a) through (e), treat as unclassified any data entries remaining in the second result type group;
store each data entry in the final result set, with or without additional processing, to a data warehouse that is configured to store curated and classified data elements, in accordance with the corresponding arrived at classification result; and
reference records in the data warehouse in response to queries from a computer terminal.

29. The non-transitory computer-readable storage medium of claim 28, wherein at least one of the model stacks includes a vector space model configured to output classification results and a family of Bayesian generalized linear models configured to assign confidence scores to classification results output from the vector space model.

30. The non-transitory computer-readable storage medium of claim 28, wherein:
the adaptive ensembling is performed as a function of a level of information uncertainty and a confidence level, and
the adaptive ensembling produces classification results:
   (a) without combining the output from multiple model stacks in response to a first executed model stack producing an intermediate classification result with a high confidence level while operating with a low level of information uncertainty;
   (b) based on a form of proportional voting in response to the executed model stacks producing intermediate classification results with low confidence levels while operating with a low level of information uncertainty, provided that there is agreement among the model stacks at one or more levels of granularity in a taxonomy of classifications; and
   (c) based on a form of simple majority-rules voting, (i) in response to part (b) failing, and (ii) in response to the executed model stacks producing intermediate classification results with high confidence levels while operating with a high level of information uncertainty.

* * * * *